(12) United States Patent
Oglesbee

(10) Patent No.: US 7,271,569 B2
(45) Date of Patent: Sep. 18, 2007

(54) CONTACT LESS CHARGER WITH ALIGNMENT INDICATOR

(75) Inventor: John Wendell Oglesbee, Watkinsville, GA (US)

(73) Assignee: Motorola Inc., Schaumburg, IL (US)

(*) Notice: Subject to any disclaimer, the term of this patent is extended or adjusted under 35 U.S.C. 154(b) by 380 days.

(21) Appl. No.: 10/945,695

(22) Filed: Sep. 21, 2004

(65) Prior Publication Data

US 2006/0061324 A1 Mar. 23, 2006

(51) Int. Cl.
*H01M 10/46* (2006.01)
(52) U.S. Cl. ..................................... 320/108
(58) Field of Classification Search ............... 320/107, 320/108, 114, 115
See application file for complete search history.

(56) References Cited

U.S. PATENT DOCUMENTS

| | | | |
|---|---|---|---|
| 5,122,729 A | 6/1992 | Itoga et al. | |
| 5,952,814 A | 9/1999 | Van Lerberghe | |
| 6,184,651 B1 | 2/2001 | Fernandez et al. | |
| 6,683,438 B2 | 1/2004 | Park et al. | |
| 6,894,456 B2 * | 5/2005 | Tsukamoto et al. | 320/107 |
| 2003/0030342 A1 | 2/2003 | Chen et al. | |
| 2003/0048254 A1 | 3/2003 | Huang | |

FOREIGN PATENT DOCUMENTS

| | | |
|---|---|---|
| GB | 2 314 470 A | 12/1997 |
| GB | 2 389 720 A | 12/2003 |
| GB | 2 398 176 A | 8/2004 |
| JP | 2004350465 | 12/2004 |

\* cited by examiner

*Primary Examiner*—Edward H. Tso
(74) *Attorney, Agent, or Firm*—Hisashi D. Watanabe

(57) ABSTRACT

A contactless, inductive charger having a generally planar surface is provided. An image, text or other visual indicator is disposed upon the substantially planar surface such that the visual indicator represents a preferred placement orientation for an electronic device for optimal inductive charging. The charger includes a primary coil positioned within the boundaries of the image, such that a user has a visual guide for placing the device on the charging surface for maximum efficiency in charging. The visual indicator, which may be a picture, outline, text or other directional indicator, may be geometrically similar to a shape of the electronic device or may be in the shape of a generic device. It may be disposed upon the charger by a method selected from the group consisting of painting, molding, silk screening, plating, vapor deposition and adhesive retention.

16 Claims, 6 Drawing Sheets

CONTACT LESS CHARGER WITH ALIGNMENT INDICATOR

BACKGROUND

1. Technical Field

This invention relates generally to the field of contactless battery chargers for portable devices, and more particularly to a contactless charger with an alignment indicator to facilitate efficient charging.

2. Background Art

Contactless, or inductive, electrical connections are well known in the field of portable electrical devices. For example, portable, motorized toothbrushes typically contain a rechargeable battery which is charged by an inductive connection. Similarly, portable wireless communication devices, such as two-way RF radios, cellular phones, paging devices, and wireless communicators, commonly utilize a rechargeable battery that, in certain applications, is recharged by contactless, induction charging.

Most all contactless chargers charge batteries by induction. Current, passed through a coil, creates a magnetic flux in accordance with Ampere's law. When a second coil is placed in close proximity to such a current-driven coil, the flux couples to the second coil, thereby "inducing" a current in the second coil. Such an induction circuit is illustrated in FIG. 1.

Turning now to FIG. 1, an inductively coupled charging system 10 has a primary side or base device 12 and a secondary side or portable device 16. A primary controller used as a primary charging device 11 as would be well known to one of ordinary skill in the art, is shown connected to the AC power source and to a primary coil 13. The primary coil 13 is shown inductively coupled to secondary coil 15 by field 14. The secondary coil 15 is coupled to battery 21 through a secondary charging device which is shown in this example as a rectifier circuit 19. The battery 21 in turn is connected to the load shown as RL 23. As would be well known to one of ordinary skill in the art, the energy coupled from the primary coil 13 is applied through the secondary coil 15 to charge the battery 21.

One problem that plagues most contactless chargers is aligning the secondary coil with the primary coil so as to couple the most magnetic flux to the secondary, thereby ensuring the most efficient charging process. One prior art solution for aligning the primary coil and secondary coil is to make a charger with a pocket having an encapsulated contactless plug, such that when an electronic device is placed in the pocket, the contactless plug fits within the device and aligns the primary coil with the secondary coil. This is referred to as a "lock and key" solution, in that the encapsulated plug serves as a "key" that fits into a recess in the device, which serves as the "lock". Such a charger is taught in U.S. Pat. No. 5,952,814, entitled "Induction Charging Apparatus and an Electronic Device", and is shown generally in FIG. 2.

The problem with the lock and key solution is that a unique charger must be specifically designed for each electronic device. Since every electronic device has a unique shape or form factor, manufacturers must make unique chargers to accommodate all of their different products. This specialization of chargers makes the product time consuming to design and expensive to manufacture.

Accordingly, there is a need for an improved, contactless charging system that facilitates alignment of the primary and secondary coils.

DETAILED DESCRIPTION OF THE INVENTION

Figure 1:
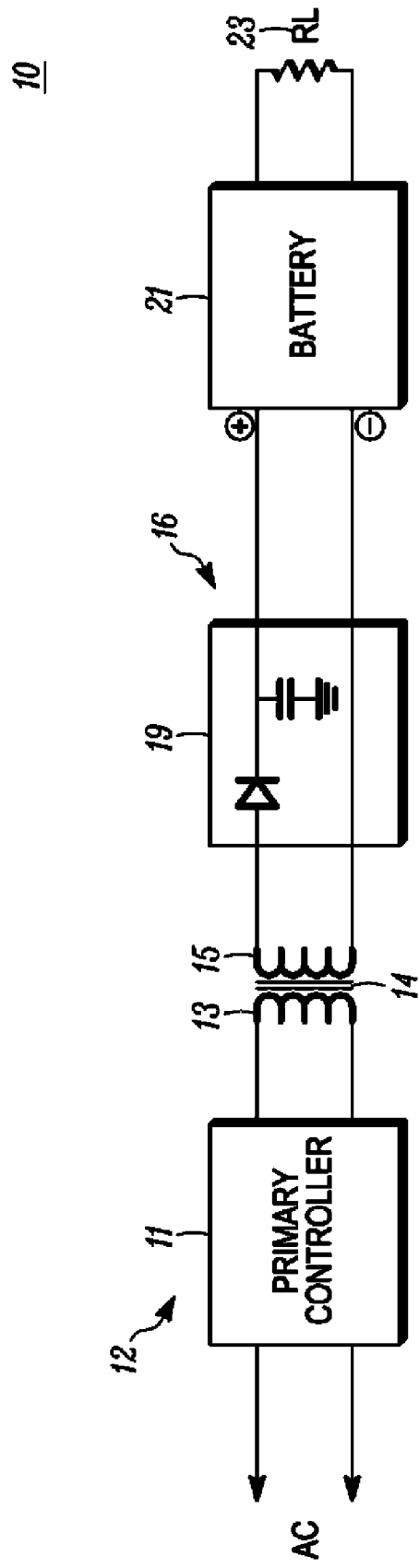
FIG. 1 illustrates a prior art contactless, inductive charging circuit.
Figure 2:
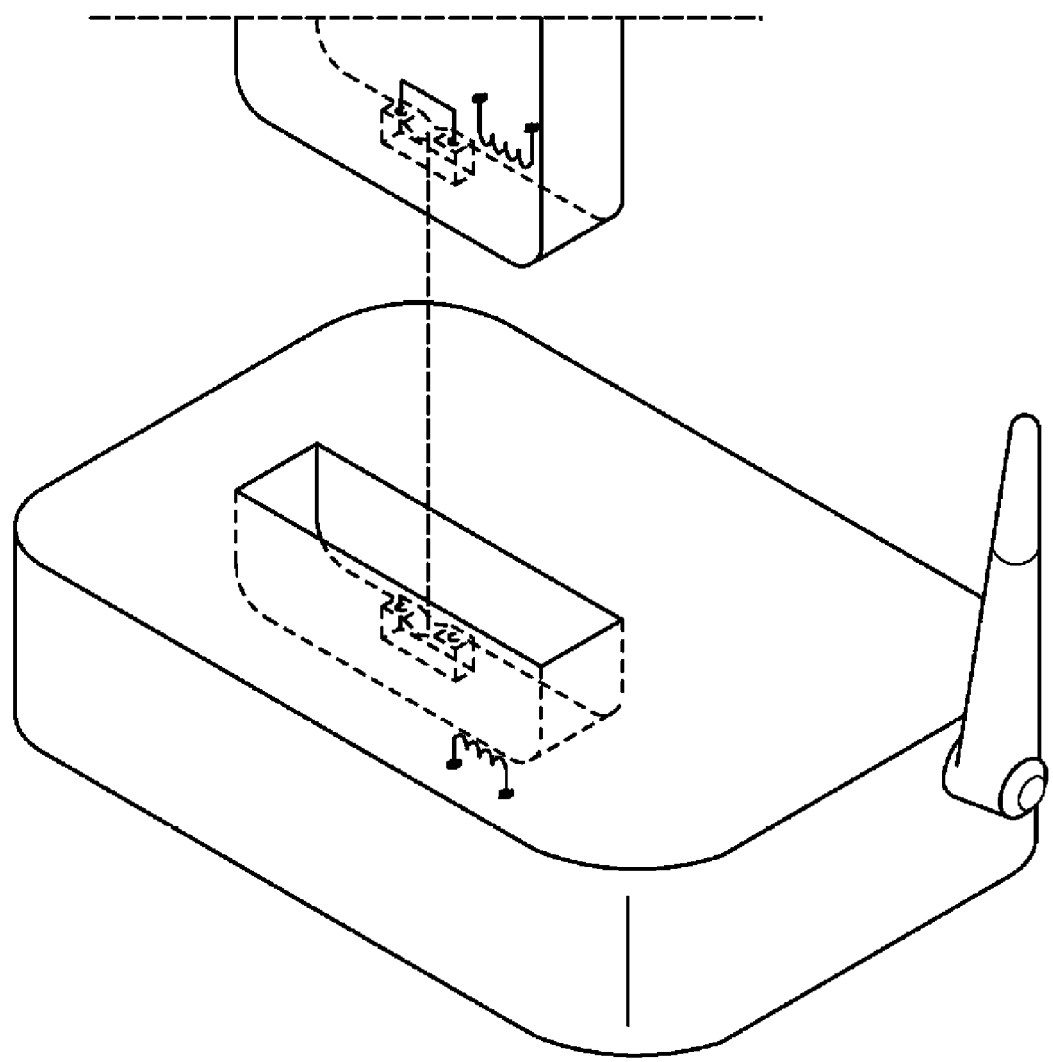
FIG. 2 illustrates a prior art contactless charger.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 3:
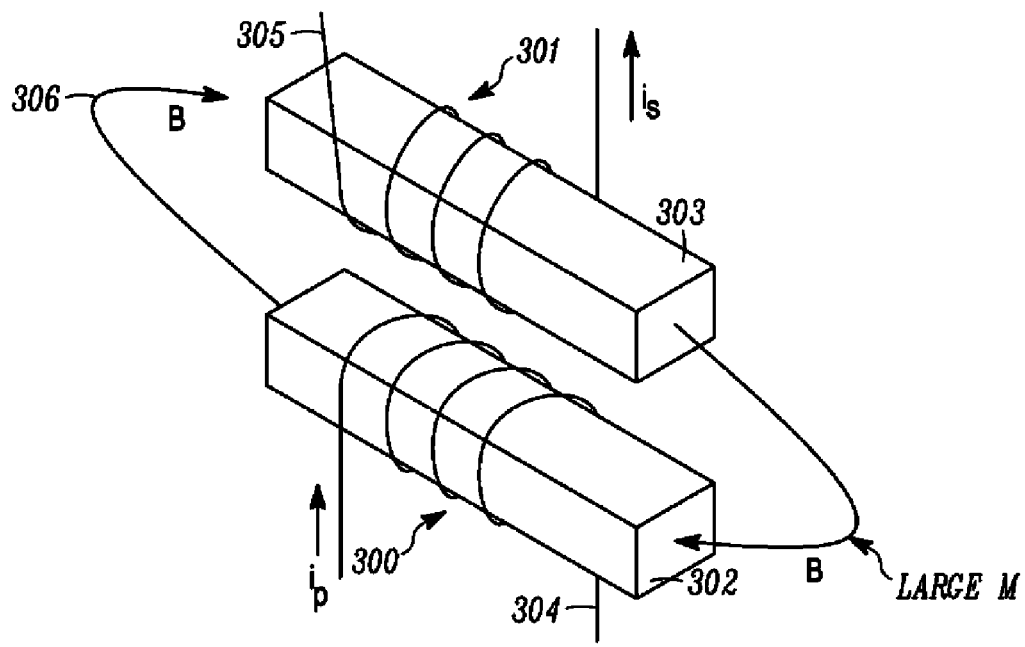
FIGS. 3 and 4 illustrate primary and secondary coils aligned and misaligned, respectively.
Figure 4:
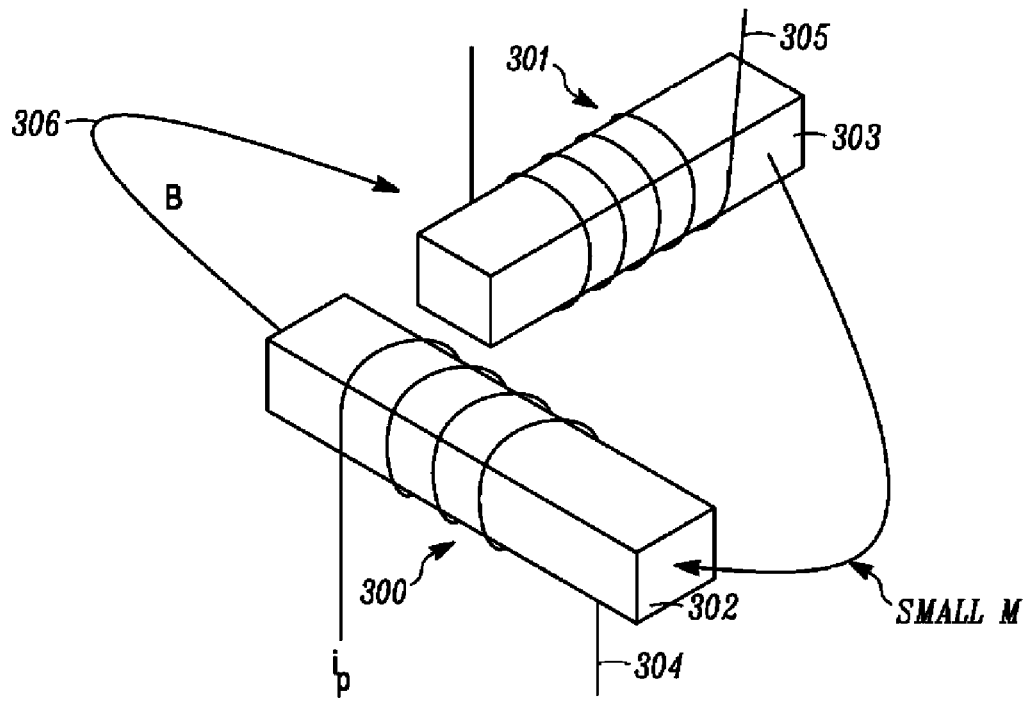

Turning now to FIGS. 3 and 4, illustrated therein is a visual representation of the coupling between a primary 300 and secondary 301 of an inductive charging system. FIGS. 3 and 4 illustrate just why alignment is important in a contactless charging system. In FIG. 3, the primary 300 and secondary 301 are aligned, while in FIG. 4 the primary 300 and secondary 301 are misaligned relative to an efficient charging process.

The primary 300 includes a wire 304 that is coiled about a core 302. The core 302 is optional, in that some primary windings use air, plastic or other material as a core. However, for maximum efficiency, the core 302 is generally a metal with a high magnetic permeability, like iron. As is known in the art, when current Ip passes through the coil of wire 304, a magnetic field 306 is generated in accordance with Ampere's law. This magnetic field 306 forms a closed loop about the core 302. If a secondary 301 is placed within the field 306, such that the field 306 passes through the coil of secondary wire 305, a secondary current Is is generated. It is the goal of contactless charging to maximize the efficiency of this current-to-magnetic field-to-current conversion.

The conversion is maximized, i.e. is most efficient, when the primary 300 and secondary 301 are aligned such that the magnetic field 306 passes through all of the turns of wire 305 in the secondary. In the exemplary embodiment of FIG. 3 where the core 303 of the secondary is a rectangular bar, this occurs when the primary core 302 and secondary core 303 are parallel and adjacent to each other. The magnetic field 306 runs through each turn in the secondary 301.

In FIG. 4, by contrast, the magnetic field 306 passes through at most one or two turns of the secondary 301 because the primary core 302 and secondary core 303 are skew. In this alignment, the efficiency of energy transfer will be reduced by an order of magnitude or more when compared to the alignment of FIG. 3. Consequently, to obtain useful amounts of energy from a wireless charger, one must ensure that the primary and secondary are properly aligned so as to maximize the energy transfer from primary to secondary. Such is the object of the present invention.

Figure 5:
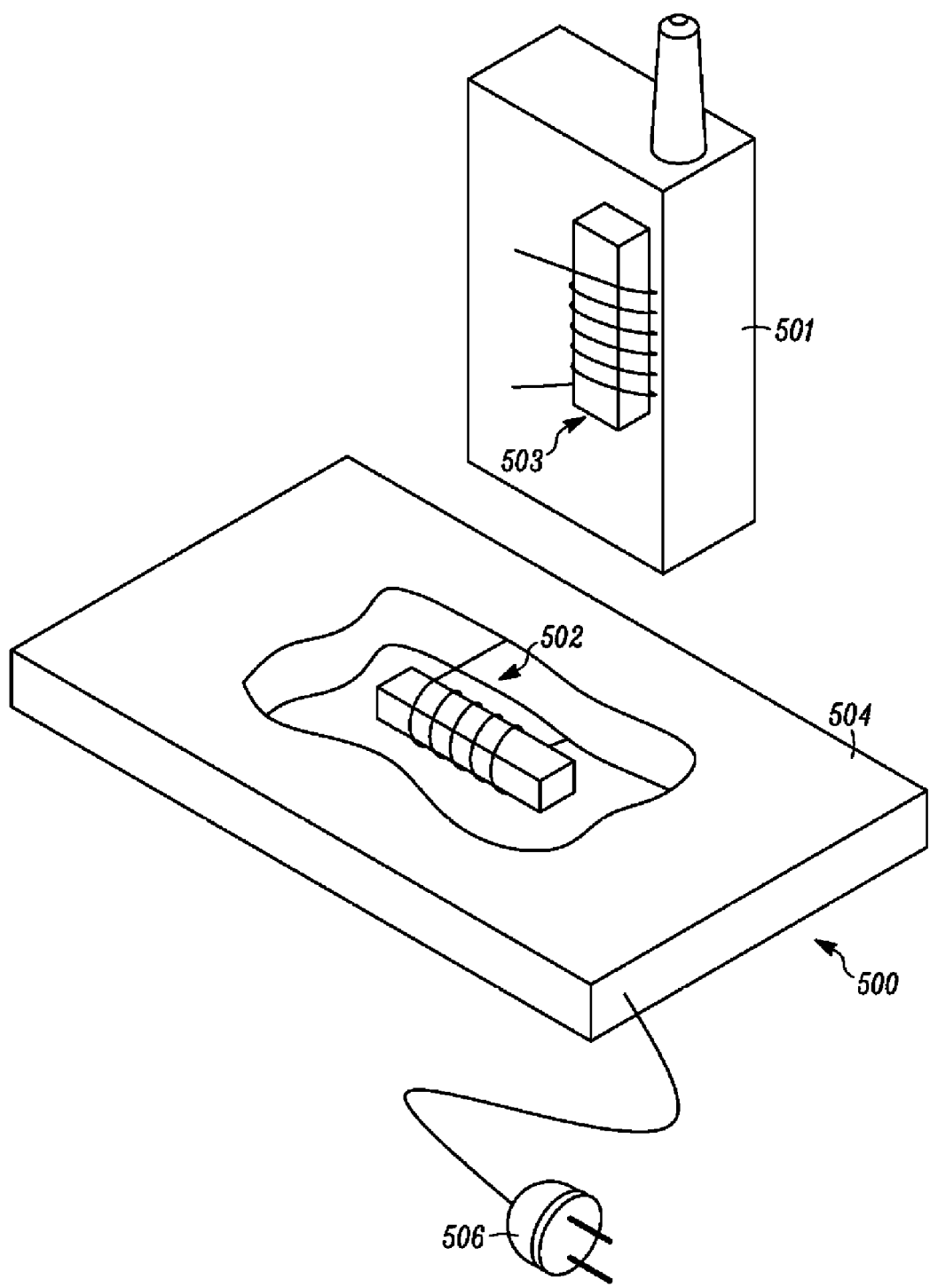
FIG. 5 illustrates a cutaway view of a contactless charger in accordance with the invention.

Turning now to FIG. 5, illustrated therein is a cutaway view of one preferred embodiment a contactless charger in accordance with the invention. The contactless charger 500 includes a charging surface 504 that is substantially planar. While ornamental and industrial designs may dictate a charging surface 504 that deviates from a plane, a generally planar surface is preferred such that an electronic device, e.g. 501, placed upon the charging surface 504 will not slide off.

The charger 500, shown here in a cutaway drawing, includes a primary coil 502 for transferring power to an electronic device 501 to be used for charging a battery. The primary coil 502 receives power from a power source 506, and may include circuitry, including a primary controller like that shown in FIG. 1. An electronic device includes a secondary coil 503 for receiving power from the primary coil 502 when the electronic device 501 is placed on the charging surface 504.

Figure 6:
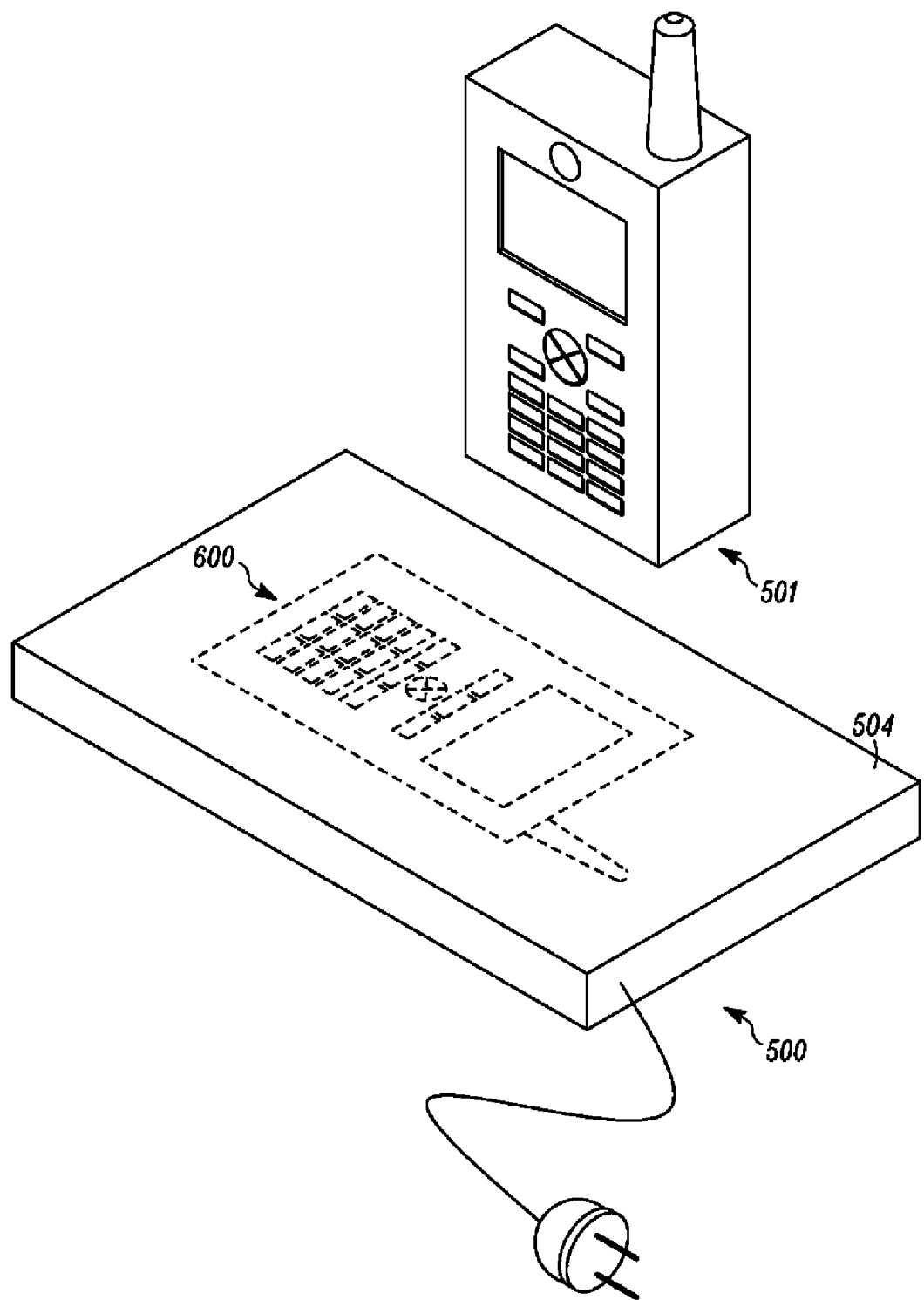
FIG. 6 illustrates a non-cutaway view of a contactless charger in accordance with the invention.

Turning now to FIG. 6, illustrated therein is the non-cutaway view of one preferred embodiment of a contactless charger in accordance with the invention. To ensure proper coupling between the primary and secondary coils, a graphic representation 600 of the electronic device 501 is disposed upon the charging surface 504 of the charger 500. The graphic representation 600 is positioned such that the primary coil is disposed within the boundaries of the graphic representation 600. When the electronic device 501 is placed upon the graphic representation 600, such that the electronic device 501 is aligned with the graphic representation 600, the primary coil of the charger 500 becomes aligned with the secondary coil of the electronic device 501. As such, positioning the electronic device 501 within the boundaries of the graphic representation 600 facilitates efficient, inductive power transfer.

The graphic representation 600 may take many forms. In one embodiment, the graphic representation may be a pictorial representation of the electronic device 501. In another embodiment, the graphic representation 600 may be an outline of the electronic device. Alternatively, the graphic representation may be a pictorial representation of a generic electronic device, an outline of a generic electronic device, a textual description of a preferred electronic device orientation, text or other visual indicators of the electronic device orientation. In the embodiment of FIG. 6, the electronic device 501 shown is a cellular telephone and the graphic representation 600 is a corresponding dashed outline of the cellular telephone. The outline indicates both the position and alignment for maximum, contactless energy transfer.

The graphic representation 600 may be disposed upon the charging surface 504 by any of a variety of methods. These methods include painting, silk screening, plating, printing, lithography, etching and vapor deposition. Alternatively, the graphic representation may be molded into the charging surface 504 by an injection molding or other equivalent process. It will be clear to those of ordinary skill in the art having the benefit of this disclosure that the charger 500 of the present invention may be used with a variety of electronic devices, including telephones, two-way radios, computer mice, pagers, personal digital assistants, music players, video players and portable computers. As such, the graphic representation 600 may depict any or a combination of these devices.

Figure 7:
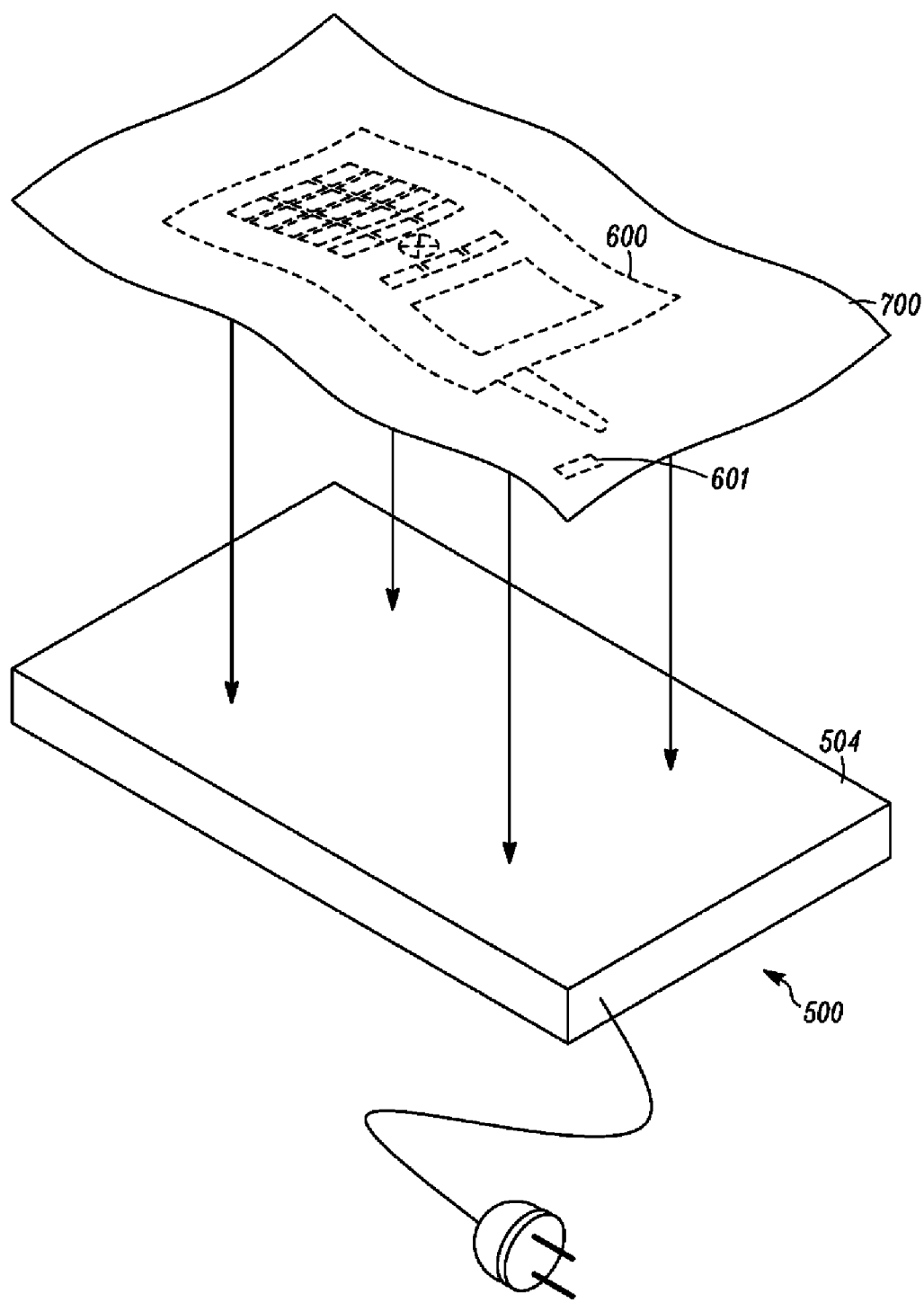
FIG. 7 illustrates an alternate embodiment of a contactless charger in accordance with the invention.

Turning now to FIG. 7, illustrated therein is an alternate embodiment of the invention. In this embodiment, the graphic representation 600 is disposed upon an adhesive sheet 700 that is coupled to the charging surface 504 by adhesive retention. This embodiment allows the charger 500 to be customizable in that any of a variety of adhesive sheets 700 may be placed atop a universal charger 500. As such, a manufacturer that makes contactless chargers for both phones and pagers, for example, can make a single charger for both devices simply by changing the adhesive sheet 700. As with the embodiment of FIG. 6, the graphic representation may include text 601 or other directional indicators to aid a user with alignment of the electronic device.

To summarize, this invention provides a contactless charger for an electronic device, wherein the charger includes a graphic representation or an image disposed on the charger. The image is indicative of a preferred orientation of the electronic device for efficient, contactless charging. In one embodiment, the image is geometrically similar to the electronic device, and may take the form of outlines, pictures, text, and directional indicators.

The invention may be used with a variety of devices. For example, if the device is a cellular telephone, the image may comprise an outline of the cellular telephone. The contactless, or inductive, charger may include a substantially planar surface, and the image or visual indicator is disposed upon the substantially planar surface such that the visual indicator represents an orientation of an electronic device associated with optimal inductive charging. The visual indicator may be representative of the specific electronic device to be charged, or may be generic in shape so as to make the charger more universal.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims.

What is claimed is:

1. A contactless charger, comprising:
    a graphic representation of a portable electronic device disposed upon a charging surface of the contactless charger; and
    a primary coil disposed within the boundaries of the graphic representation;
    wherein, when the portable electronic device is placed upon the graphic representation, the primary coil of the contactless charger aligns with a secondary coil of the portable electronic device.

2. The contactless charger of claim 1, wherein the graphic representation is selected from the group consisting of pictorial representations of the portable electronic device, outlines of the portable electronic device, pictorial representations of a generic electronic device, outlines of a generic electronic device, textual descriptions of the portable electronic device orientation, and visual indicators of the portable electronic device orientation.

3. The contactless charger of claim 2, wherein the graphic representation is disposed upon the contactless charger by a method selected from the group consisting of painting, molding, silk screening, plating, vapor deposition, printing, lithography, etching and adhesive retention.

4. The contactless charger of claim 3, wherein the charging surface of the contactless charger is substantially planar.

5. The contactless charger of claim 1, wherein the portable electronic device is selected from the group consisting of telephones, two-way radios, computer mice, pagers, personal digital assistants, music players, video players and portable computers.

6. A contactless charger for a portable electronic device, comprising:
    an image of the portable electronic device disposed upon a charging surface of the contactless charger; and a primary coil disposed within the boundaries of the image;

wherein, when the portable electronic device is placed upon the image, the primary coil of the contactless charger aligns with a secondary coil of the portable electronic device.

7. The contactless charger of claim 6, wherein the image is geometrically similar to the portable electronic device.

8. The contactless charger of claim 6, wherein the image is selected from the group consisting of outlines, pictures, text, and directional indicators.

9. The contactless charger of claim 8, wherein the image is disposed upon the contactless charger by a method selected from the group consisting of painting, molding, silk screening, plating, vapor deposition and adhesive retention.

10. The contactless charger of claim 8, wherein the potable electronic device comprises a cellular telephone, further wherein the image comprises an outline of the cellular telephone.

11. An inductive charger, comprising
a. a substantially planar charging surface;
b. a visual indicator of a portable electronic device disposed upon the substantially planar charging surface; and
c. a primary coil disposed within the boundaries of the visual indicator;

wherein, when the portable electronic device is placed upon the visual indicator, the primary coil of the inductive charger aligns with a secondary coil of the portable electronic device.

12. The inductive charger of claim 11, wherein the visual indicator is geometrically similar to a shape of the portable electronic device.

13. The inductive charger of claim 12, wherein the visual indicator is selected from the group consisting of pictures of the portable electronic device, graphic representations of the portable electronic device, outlines of the portable electronic device, pictures of a generic electronic device, graphic representations of a generic electronic device and outlines of a generic electronic device.

14. The inductive charger of claim 13, wherein the visual indicator is disposed upon the inductive charger by a method selected from the group consisting of painting, molding, silk screening, plating, vapor deposition printing, lithography, etching and adhesive retention.

15. The inductive charger of claim 14, wherein the portable electronic device comprises a cellular telephone.

16. The inductive charger of claim 11, wherein the visual indicator is shaped to represent a generic electronic device.

* * * * *